United States Patent
Oyzerskiy

(10) Patent No.: US 10,023,321 B1
(45) Date of Patent: Jul. 17, 2018

(54) METHOD AND APPARATUS FOR FORMING BARRIERS WITHIN CAVITIES

(71) Applicant: The Boeing Company, Chicago, IL (US)

(72) Inventor: Eduard Oyzerskiy, Sandy, UT (US)

(73) Assignee: The Boeing Company, Chicago, IL (US)

(*) Notice: Subject to any disclaimer, the term of this patent is extended or adjusted under 35 U.S.C. 154(b) by 958 days.

(21) Appl. No.: 13/926,225

(22) Filed: Jun. 25, 2013

(51) Int. Cl.
*B64D 37/00* (2006.01)
*F16K 15/20* (2006.01)

(52) U.S. Cl.
CPC .............. *B64D 37/00* (2013.01); *F16K 15/20* (2013.01)

(58) Field of Classification Search
CPC ... E03F 7/02; B64C 1/064; B64C 3/18; B64C 3/182; B64C 3/34; B64F 5/09; B64F 5/0009; F16L 155/13
USPC .......... 137/233, 234.5, 899.2, 225; 52/309.5, 52/309.16, 380–4, 407.5, 576
See application file for complete search history.

(56) References Cited

U.S. PATENT DOCUMENTS

| | | | |
|---|---|---|---|
| 1,051,738 A * | 1/1913 | Kavanagh ................... | 152/338.1 |
| 2,843,154 A * | 7/1958 | Hosking ......................... | 138/93 |
| 2,999,272 A * | 9/1961 | Warnken ........................ | 425/389 |
| 3,305,420 A * | 2/1967 | Brownlee et al. ............ | 156/217 |
| 3,422,837 A * | 1/1969 | Boyer et al. .................. | 137/322 |
| 3,768,501 A * | 10/1973 | Elson et al. ................... | 137/231 |
| 4,329,132 A * | 5/1982 | Melvold et al. ................ | 425/13 |
| 4,615,455 A * | 10/1986 | Tansill .......................... | 220/88.1 |
| RE32,354 E * | 2/1987 | Savage ............................ | 222/81 |
| 5,332,178 A * | 7/1994 | Williams .................... | 244/123.3 |
| 5,878,784 A | 3/1999 | Sales et al. | |
| 6,021,978 A * | 2/2000 | Goss .......................... | 244/129.2 |
| 6,896,841 B2 * | 5/2005 | Velicki et al. ................ | 264/510 |
| 8,096,503 B2 * | 1/2012 | Verweyen ..................... | 244/119 |
| 8,156,711 B2 * | 4/2012 | Hethcock et al. ............. | 52/790.1 |
| 8,167,245 B1 | 5/2012 | Koehler et al. | |
| 8,216,499 B2 * | 7/2012 | Sherwood et al. ......... | 264/210.2 |
| 2007/0011970 A1* | 1/2007 | Hethcock et al. ............ | 52/481.1 |
| 2011/0011008 A1* | 1/2011 | Dagher et al. ................. | 52/2.15 |
| 2011/0056624 A1* | 3/2011 | Gensewich et al. .......... | 156/285 |
| 2011/0076461 A1* | 3/2011 | Jacob .................... | B29C 33/505 |
| | | | 428/178 |
| 2012/0187246 A1 | 7/2012 | Motohashi et al. | |
| 2012/0241560 A1 | 9/2012 | Erickson | |
| 2013/0011605 A1* | 1/2013 | Miller .......................... | 428/119 |

FOREIGN PATENT DOCUMENTS

EP 0682204 B1 8/2000

* cited by examiner

*Primary Examiner* — Jessica Cahill
*Assistant Examiner* — Daphne M Barry
(74) *Attorney, Agent, or Firm* — Yee & Associates, P.C.

(57) ABSTRACT

A barrier is installed within an elongate cavity in a structure. Spaced apart walls are installed within the cavity, and the cavity between the walls is filled with a sealant. The sealant is allowed to cure, following which the walls are removed.

14 Claims, 7 Drawing Sheets

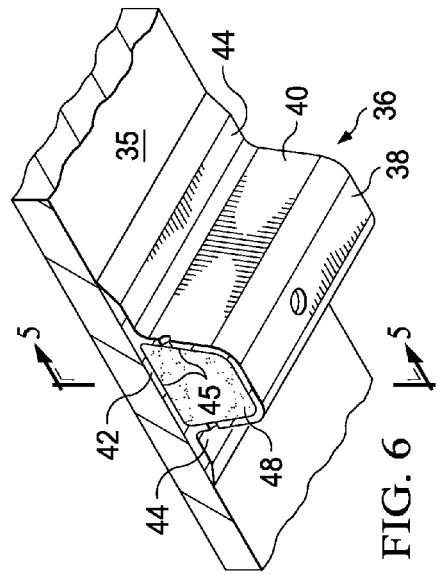
FIG. 6
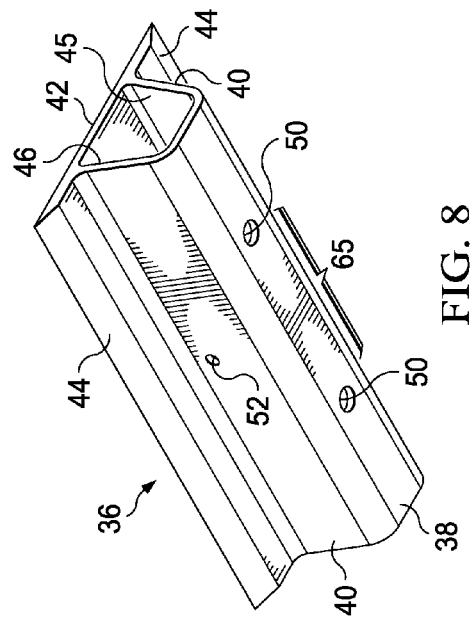
FIG. 8
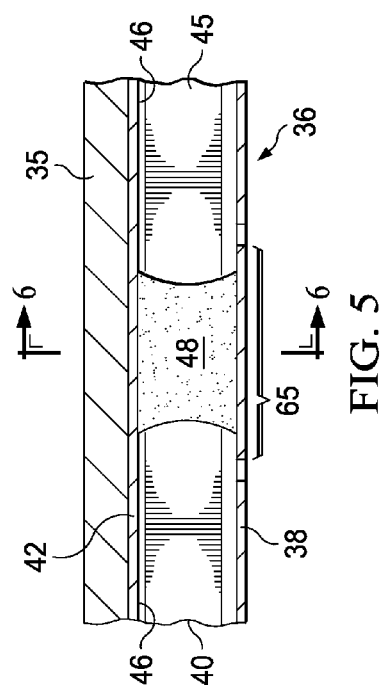
FIG. 5
FIG. 7

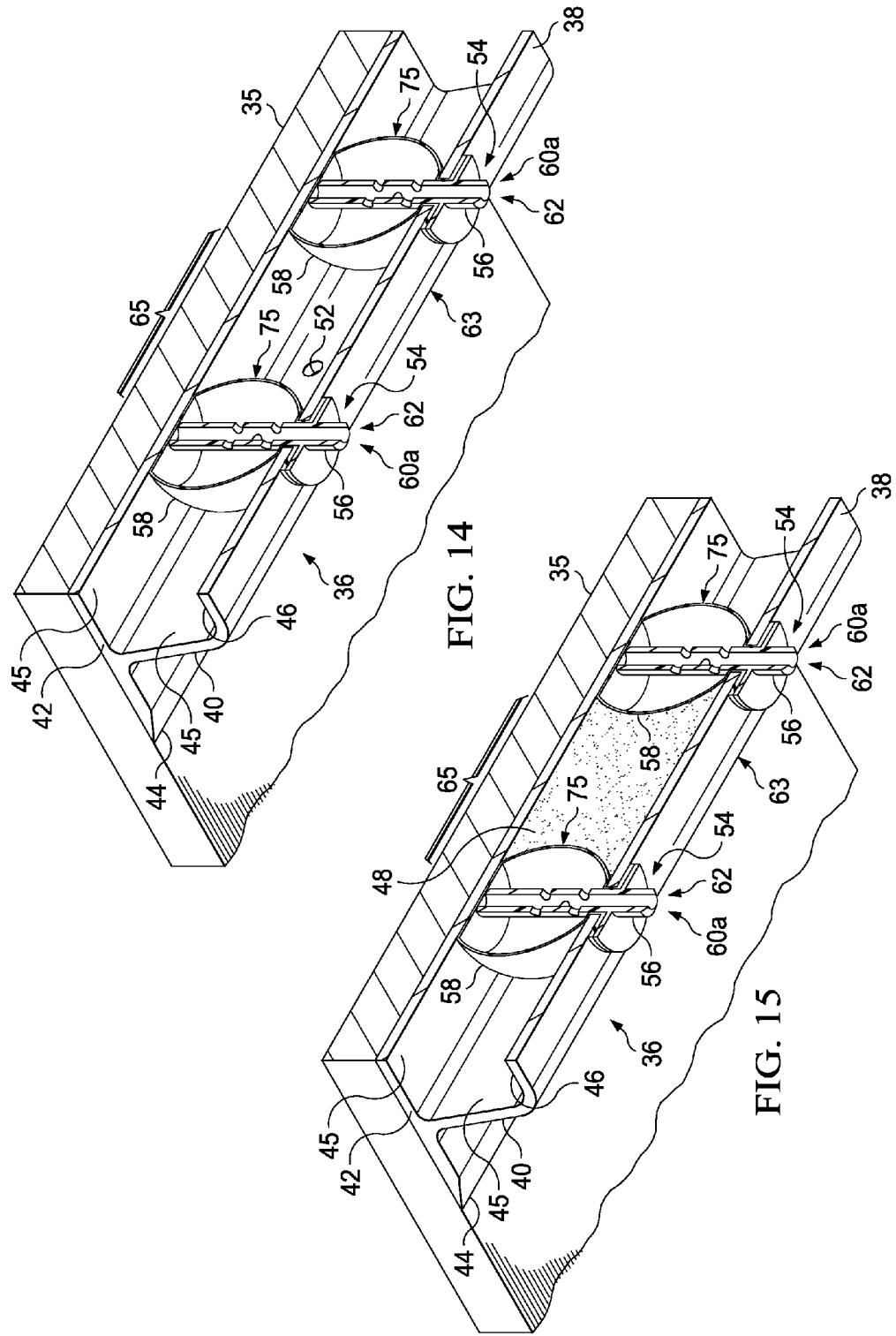

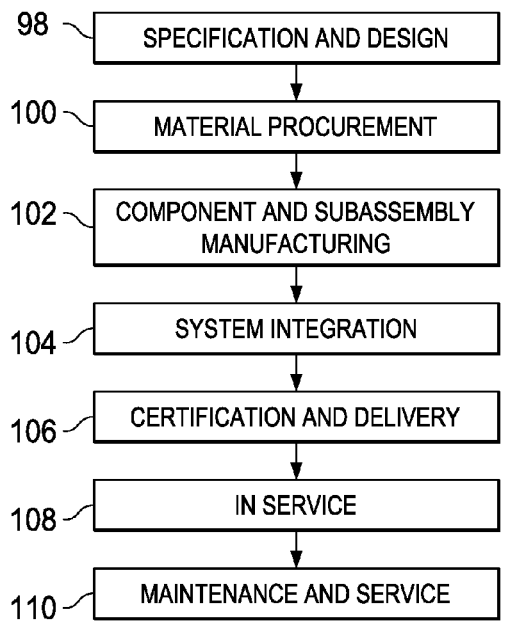
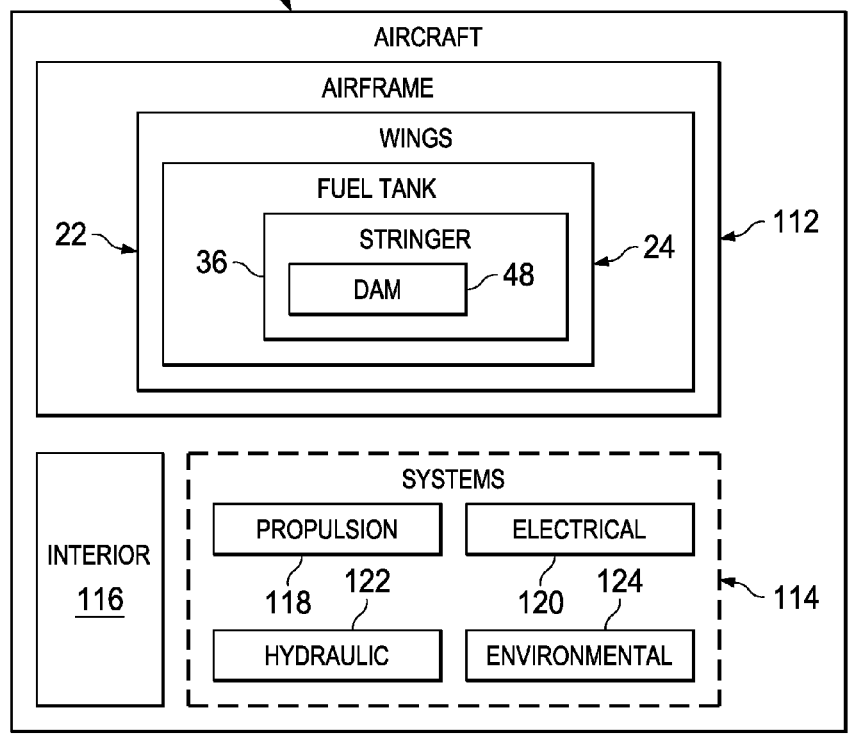

METHOD AND APPARATUS FOR FORMING BARRIERS WITHIN CAVITIES

BACKGROUND INFORMATION

1. Field

The present disclosure generally relates to forming barriers within cavities of structures, and deals more particularly with a method and apparatus for forming a dam inside a hollow structural member such as a stringer.

2. Background

Some aircraft are designed with wings that incorporate multiple internal fuel tanks. In one design approach, referred to as a "wet wing", the fuel tanks are integrated into the internal structural components of the wing. These internal components may include a combination of spars, ribs, stringers and other elements which must be joined and sealed to prevent undesired escape or leakage of fuel and fuel vapor from the tanks. For example, hollow stringers extending in the span-wise direction of the wing may traverse over one or more internal fuel tanks and may communicate with the internal volume of the tanks. The hollow stringers must therefore be internally sealed to prevent them from acting as conduits allowing passage of fuel and/or fuel vapor through the wing.

One known solution for internally sealing stringers involves installing a plug-like barrier, sometimes referred to as a fuel dam, inside the stringer. In order to install the dam, an opening must be cut in the one or more walls of the stringer. The opening must be relatively large in order to permit insertion of the dam into the interior of the stringer. The dam may consist of either a unitary or a multi-piece part formed of plastic or metal which is configured to substantially match the cross-sectional shape of the stringer's hollow interior. After the dam has been inserted, fasteners are installed through the stringer to retain the dam in place.

The solution described above is less than completely satisfactory for several reasons. Cutting an opening in the stringer to accommodate the dam installation process may involve undesirable cutting through structural elements of the stringer. Also, the dam along with the retention fasteners add undesired weight to the aircraft's wings, and may be costly to fabricate and assemble. Furthermore, the dam installation process is labor-intensive and can be difficult to carry out where the area surrounding the stringer has limited access or clearance.

Accordingly, there is a need for a method and apparatus of forming a barrier or dam within an internal cavity of a structure such as a stringer which reduces or eliminates the need for cutting relatively large openings in the structure, or other structural disturbances. There is also a need for an internal dam of the type mentioned above that is cost-effective, lightweight, easy to install and capable of forming an effective, sealed barrier inside the structure.

SUMMARY

The disclosed embodiments provide a method and apparatus for installing a unitary, lightweight, barrier within an internal cavity of an elongate structure such as an aircraft stringer. In an aircraft stringer application, the barrier acts as an internal dam or retardant plug that blocks the flow of fuel, fuel vapor and/or air through the hollow interior of the stringer. The dam comprises a light weight, flowable sealant, such as foam, that fills a volume of the internal cavity along a stretch of the stringer. The sealant is flowed into the stringer's internal channel cavity through relatively small holes in walls of the stringer, thereby obviating the need for cutting large openings in the stringer during the installation process. The sealant sets and cures at room temperature, and forms a barrier within the stringer that is substantially impermeable and impervious to fuel, fuel vapors and air.

According to one disclosed embodiment, a method is provided of installing a barrier within an elongate cavity in a structure. The method comprises installing spaced apart walls within the cavity and filling the cavity between the walls with a sealant. The sealant is allowed to cure, following which the walls are removed. Installing the walls includes forming first and second openings in the structure, inserting first and second inflatable membranes respectively through the openings into the cavity, and inflating the first and second inflatable membranes. The method may further comprise using first and second nipples respectively to direct pressurized air into the first and second inflatable membranes. The method may also comprise placing the first and second inflatable membranes over the first and second nipples before the first and second nipples are inserted into the first and second openings of the structure. Filling the cavity between the walls with a sealant includes forming at least one opening in a wall of the structure, and flowing the sealant through the opening into the cavity. The method may further comprise fixing the sealant against movement within the cavity by passing a retainer element through the structure and into the sealant.

According to another disclosed embodiment, a method is provided of installing a dam within a cavity in a stringer. The method comprises installing inflatable walls within the cavity in the stringer at spaced apart locations along the stringer, and inflating the inflatable walls within the cavity in the stringer. A sealant is flowed into the cavity of the stringer between the inflatable walls, following which the inflatable walls are deflated and removed from the cavity. Installing the inflatable walls may be performed by forming spaced apart openings in the stringer, and inserting balloons through the openings into stringer cavity. Inserting the balloons through the openings is performed by sleeving the balloons over nipples, and inserting the nipples having the balloons sleeved thereon through the openings and into the cavity in the stringer. Inflating the inflatable walls is performed by flowing pressurized air through the nipples into the balloons. The method may further comprise forming at least one hole in a wall of the stringer. Flowing the sealant into the cavity in the stringer includes flowing the sealant through the at least one hole.

According to still another disclosed embodiment, a method is provided of forming a dam preventing fuel or vapors from flowing through a cavity in an aircraft wing stringer spanning at least one wing fuel tank. The method comprises installing first and second containment walls at spaced apart locations within the cavity in the stringer, and filling the cavity in the stringer between the containment walls with a sealant. The method may also include removing the first and second containment walls from the cavity in the stringer after the cavity in the stringer between the first and second containment walls has been filled with the sealant. Installing the first and second containment walls includes forming first and second openings in a wall of the stringer, inserting first and second inflatable membranes respectively through the first and second openings into the cavity in the stringer, and inflating each of the first and second inflatable membranes until each of the first and second inflatable membranes closes off the cavity in the stringer. Inflating each of the first and second inflatable membranes is performed by inserting first and second air nipples respectively through the first and second openings into the cavity in the stringer. Filling the cavity in the stringer between the first and second containment walls with a sealant is performed by flowing the sealant through at least one opening in the stringer after the first and second containment walls have been installed.

According to a further disclosed embodiment, apparatus is provided for closing off an elongate cavity in a structure. The apparatus comprises a nipple and an inflatable membrane. The nipple is capable of being inserted into the cavity through an opening the structure, and has at least one air inlet adapted to be coupled with a pressurized source of air, and at least one air outlet. The inflatable membrane is sleeved over the nipple and coupled with the at least one air outlet. The inflatable membrane is capable of being inserted into the cavity along with the nipple and inflatable by the pressurized air source to close off the cavity. Each of the nipple and the inflatable membrane is substantially cylindrical in shape. Each of the nipple and inflatable membrane also include a circumferentially extending shoulder located outside of the cavity when the nipple is inserted into the cavity in the opening in the structure. The circumferentially extending shoulder of the inflatable membrane is sandwiched between the structure and the circumferential shoulder of the nipple when the nipple is inserted into the cavity through the opening in the structure. The inflatable membrane includes an inflatable balloon having a generally cylindrically shaped body coupled with the air outlet of the nipple. The balloon further includes a circumferentially extending shoulder on one end of the body capable of engaging the structure. The inflatable membrane may be a balloon. The nipple may include a generally cylindrically shaped body having a plurality of longitudinally spaced, radially extending air outlets therein, each of the air outlets be capable of flowing pressurized air into the balloon to inflate the balloon.

According to a further embodiment, a device is provided for sealing a cavity inside a stringer. The device comprises a dam that is formed from a foam which fills the cavity. The dam is sealed and conforms to interior walls of the cavity. The cavity is elongate and the dam extends along a portion of the length of the cavity. The foam is a closed cell foam that is substantially impervious to fuels, fuel vapor and air. The foam is in a form that is initially flowable through a relative small hole in the stringer, but is expandable after being flowed through the hole into the stringer to fill the cavity.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 5 is illustration of a longitudinal sectional view of a stringer attached to a wing skin and provided with a dam in an internal channel cavity thereof.

FIG. 6 is an illustration of a sectional view taken along the line 6-6 in FIG. 5.

FIG. 7 is an illustration of a perspective view of the dam shown in FIGS. 5 and 6.

FIG. 8 is an illustration similar to FIG. 4, but showing access holes having been formed in the stringer walls in preparation for installation of the dam.

FIG. 14 is an illustration of a longitudinal sectional view of the stringer shown in FIG. 13, wherein the balloons have been inflated.

FIG. 15 is an illustration similar to FIG. 14, but showing the sealant having been introduced into a stretch of the stringer between the balloons.

FIG. 17 is an illustration of a flow diagram of aircraft production and service methodology.

FIG. 18 is illustration of a block diagram of an aircraft.

DETAILED DESCRIPTION

Figure 2:
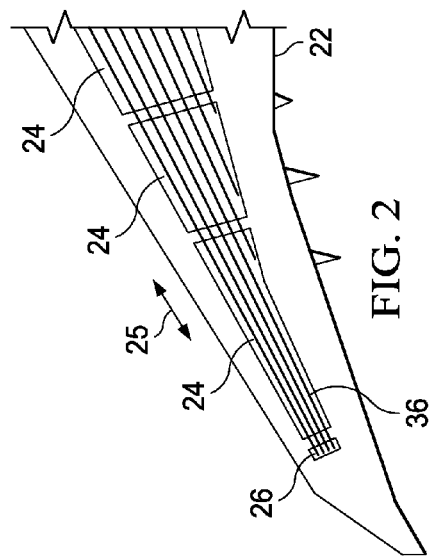
FIG. 2 is an illustration of a plan view of one of the wings of the aircraft shown in FIG. 1, indicating the position of fuel tanks.
Figure 4:
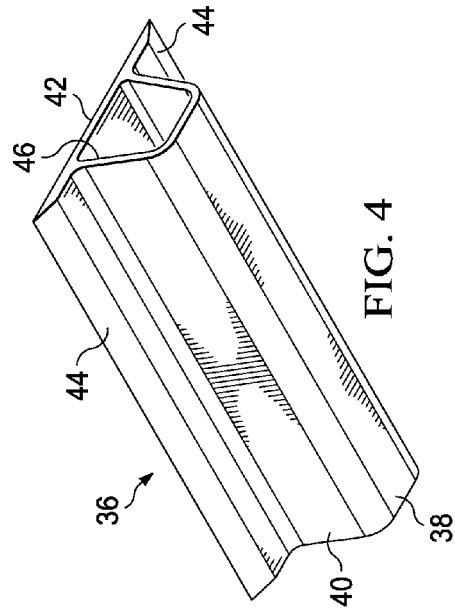
FIG. 4 is illustration of a perspective view showing a portion of a typical stringer forming part the wings.
Figure 1:
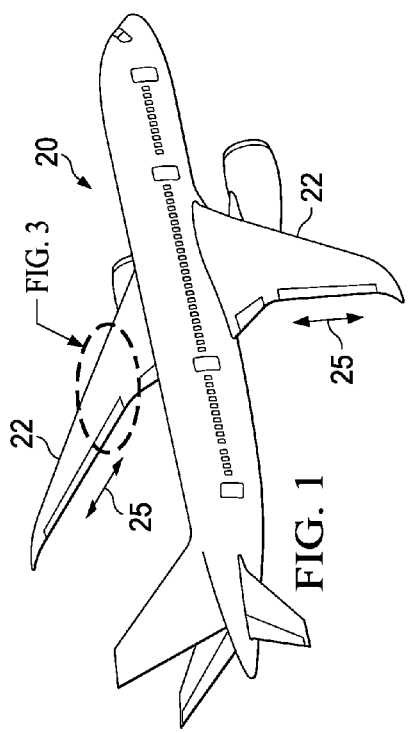
FIG. 1 is an illustration of a perspective view of an aircraft having wings provided with the integral fuel tanks.
Figure 3:
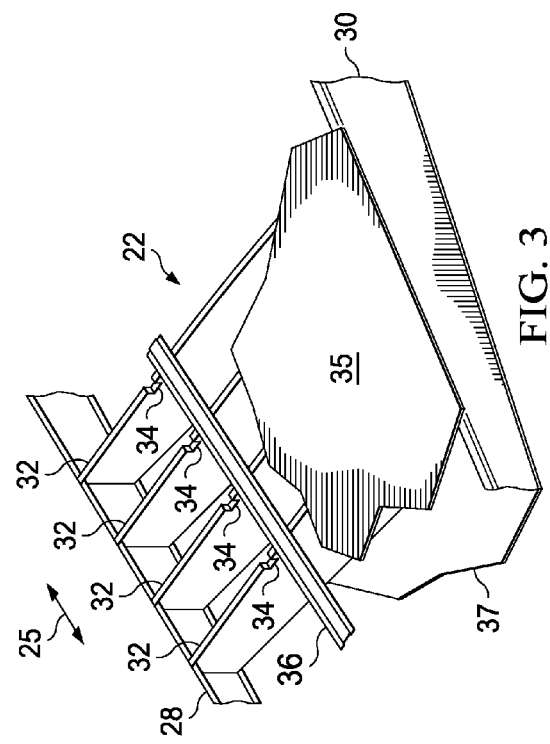
FIG. 3 is an illustration of a perspective, cut-away view showing structural components of the wings.

Referring first to FIGS. 1 and 2, an aircraft 20 has a pair of wings 22. Each of the wings 22 includes one or more integral fuel tanks 24, and may also have a vent tank 26. Referring also now to FIGS. 3 and 4, the integral fuel tanks 24 and the vent tank 26 may be formed by structural components of the wings 22, which may include front and rear spars, 28, 30 respectively, a series of spaced apart ribs 32 extending between the front and rear spars 28, 30, and a plurality of top and bottom stringers which extended in the span-wise direction 25 of the wings 20. The stringers 36 may be recessed into the grooves 34, also known as "mouseholes", in the top and bottom of the ribs 32. The stringers 36 span across and may be in communication with one or more of the fuel tanks 24. The stringers 36 are attached to upper and lower skins 35, 37 respectively by any suitable means including fasteners and/or a bonding adhesive.

FIG. 4 illustrates one typical construction of a stringer 36, sometimes referred to as a hat stringer because of its hat shaped cross-section. The stringer 36 includes a base 42 having laterally extending flanges 44, a pair of the webs or sidewalls 40, and a cap 38. The base 42, sidewalls 40 and cap 38 form an interior stringer cavity 46 that extend substantially continuously throughout the length of the stringer 36. Thus, when the stringer 36 is used as a wing stringer in the wet wings 22 shown in FIGS. 1-3, the stringer cavity 46 may act as a conduit that allows fuel, fuel vapors or air to pass between the fuel tanks 24. In order to prevent the stringer cavity 46 from acting as a conduit in this manner, a barrier or dam (see FIGS. 5-7) discussed below in more detail and also sometimes referred to herein as a dam 48, is installed in the stringer cavity 46 to seal-off prevent the flow of fuel, fuel vapors or air between the fuel tanks 24. The dam 48 fills the cavity 46, and conforms to the interior walls of the cavity 46.

Referring now to FIGS. 5-7, in accordance with the disclosed embodiments, a barrier or dam 48 is installed within the internal cavity 46 along a stretch 65 of the stringer 36. The dam 48 seals off the cavity 46 and acts as a plug-like barrier that prevents the flow of fuel, fuel vapors or air from flowing through the stringer 36 between the fuel tanks 24. The dam 48 has a cross-sectional shape substantially matching that of the interior of the stringer 36 and is sealed against the interior walls 45 of the cap 38, sidewalls 40 and base 42. The dam 48 is of unitary, one-piece construction and has concave shaped end walls 48a, however other end wall shapes are possible. The dam 48 may be formed of a suitable sealant, such as an expandable, closed cell foam, that is substantially impervious to fuel, fuel vapors and air within the stringer cavity 46. The material from which the dam 48 is formed should also be light weight and non-reactive with the material from which the stringer 36 is formed, and preferably bonds to the stringer 36. Moreover, sealants should be avoided that expand, either when initially installed or later in response to environmental conditions such as the temperature increases, to the point that the dam 48 causes the stringer 36 to bow or bulge outwardly in the area of the dam 48. Thus, the selection of the particular sealant may depend upon the type of material from which the stringer 36 is formed.

Attention is now directed to FIGS. 8-13 which illustrate a method and apparatus for forming the dam 48 in the stringer cavity 46. While a stringer 36 has been illustrated, it is to be understood that the disclosed method and apparatus may be employed to form barriers within cavities of any of a wide variety of structural members. As best seen in FIG. 8, a pair of longitudinally spaced access holes 50 are formed by any suitable technique, such as drilling, in the cap 38 of the stringer 36. Additionally, a filler hole 52 is formed in either one or both of the sidewalls 40, preferably near the flanges 44. As will be discussed below in more detail, the access holes 50 are utilized to install containment walls 75 (FIGS. 14 and 15) inside the stringer cavity 46, and the filler holes 52 allow a sealant to be flowed into the stringer cavity 46, between the containment walls 75. The access holes 50 and the filler hole 52 may be located and sized such that their presence has little (negligible) effect on the structural strength of the stringer 36 locally. Where necessary or desirable however, the stringer 36 may be reinforced in the area of the access holes 50 and the filler hole 52, by any of various techniques, such as by providing pad-ups (not shown) in the laminate forming the stringer 36. The size (diameter) of the holes 50, 52 will depend on the dimensions of the stringer 36, the size of the stringer cavity 46 and various other factors related to the particular application.

Figure 9:
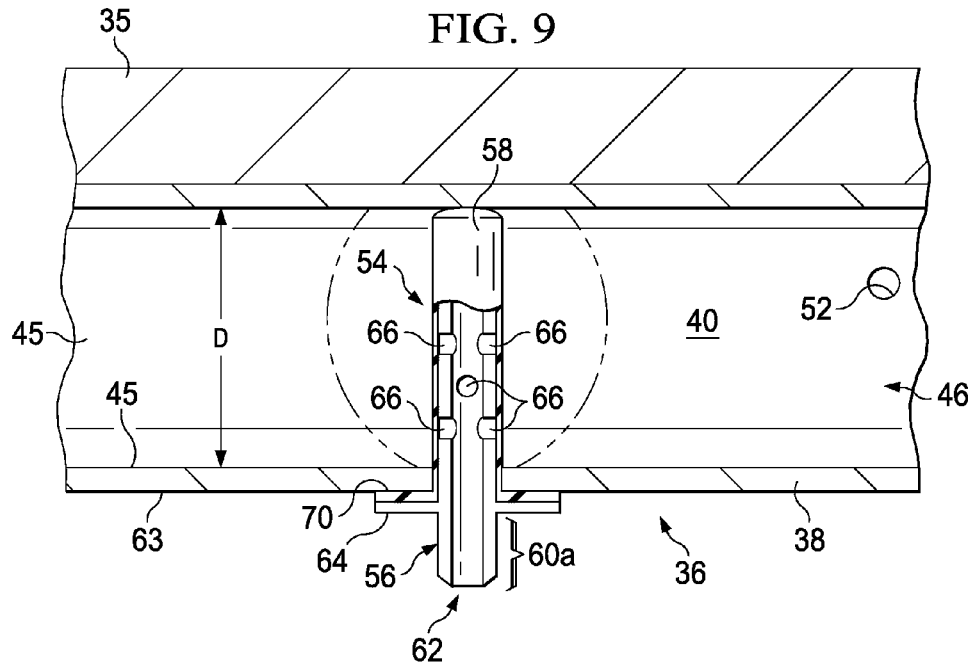
FIG. 9 is an illustration of a longitudinal sectional view of the stringer, showing an assembly of and air nipple and a balloon having been installed therein.
Figure 10:
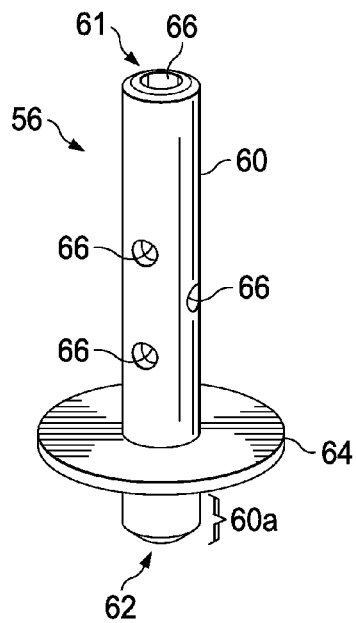
FIG. 10 is an illustration of the air nipple and balloon assembly shown in FIG. 9.
Figure 11:
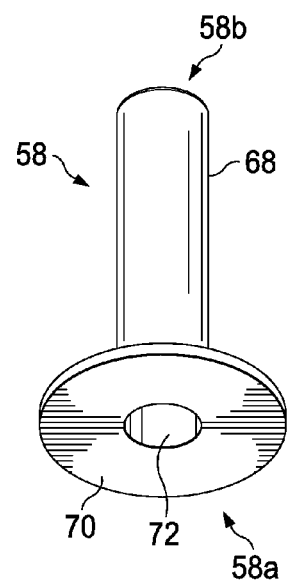
FIG. 11 is an illustration of a perspective view of the balloon.
Figure 12:
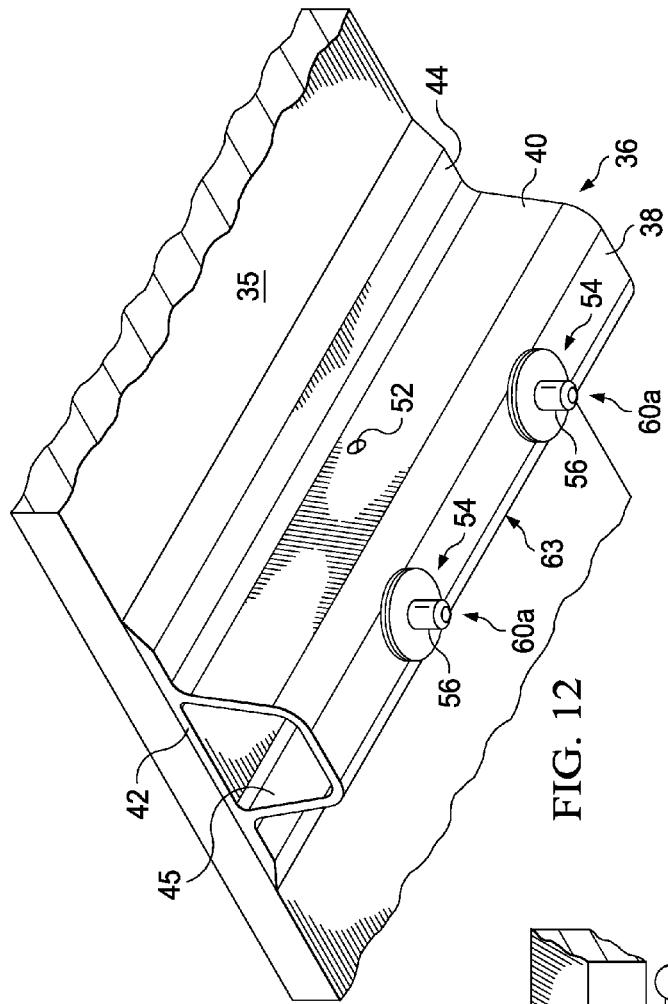
FIG. 12 is an illustration of a cross-sectional, perspective view of the stringer and wing skin, following installation of the air nipple and balloon assemblies.
Figure 13:
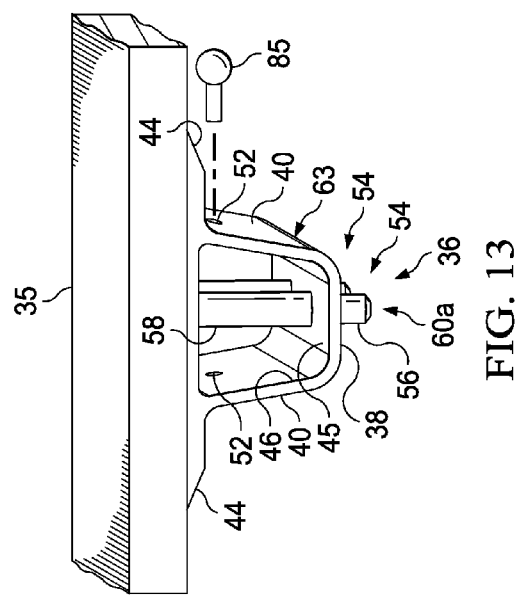
FIG. 13 is an illustration of a cross-sectional, perspective view of one end of the stringer and the wing skin shown in FIG. 12.

Referring particularly to FIGS. 9, 10 and 11, an inflatable membrane 58, sometimes also hereinafter referred to as a balloon or inflatable balloon 58, is formed of a suitable flexible material and is sleeved over an air nipple 56. The inflatable balloon 58 has a generally cylindrical body 68 and an air inlet 72 in one end 58a thereof surrounded by a circumferentially extending, flat shoulder 70. The balloon 58 may or may not be reusable and may be formed of a material such as, for example and without limitation a suitable rubber. The opposite end 58b of the balloon body 68 is closed. The air nipple 56 comprises a cylindrically shaped body 60 and a circumferentially extending flat shoulder 64. The nipple body 60 is provided with a centrally located, longitudinal through-hole 61 connecting an air inlet 62 and an air outlet 66. Although not shown in FIG. 10, but shown in FIG. 9, the nipple body 60 may have a plurality of radially extending air outlet holes 66 therein which communicate with the central through-hole 61. The air nipple 56 may be formed of any suitable rigid or semi-rigid material, such as without limitation, a plastic.

When the balloon 58 is sleeved over the air nipple 56, the shoulder 70 of the balloon 58 seats against the shoulder 64 of the air nipple 56. As best seen in FIG. 9, an assembly of the air nipple 56 and the inflatable balloon 58 passes through each of the access holes 50 in the cap 38 of the stringer 36 into the stringer cavity 46. The shoulder 70 of the balloon 58 is captured between the shoulder 64 of air nipple 56 and exterior surface 63 of the cap 38, thereby creating a substantially air-tight seal between the balloon shoulder 70 and the cap 38. The nipple body 60 and the balloon body 68 extend into the stringer cavity 46 substantially the entire depth D of the cavity 46. As will be discussed below, the air nipple 56 and the balloon 58 may be both installed and removed as a preassembled assembly. The air nipple 56 functions to facilitate both insertion of the balloon 58 into the stringer cavity 46, and inflation of the balloon 58.

Attention is now directed to FIGS. 14 and 15 which illustrate installation of the containment walls 75 and sealing of the stringer cavity 46 along a stretch 65 of the stringer 36. FIG. 14 shows the balloons 58 having been inflated through the air nipples 56 to form the containment walls 75. Although not shown in the drawings, a pressurized air source is connected with air inlet 62 of each of the air nipples 56. The pressurized air exits the air nipple 56 through the through-hole 61 and the air outlet openings 66 (FIGS. 9 and 10), entering and pressurizing the interior of the balloons 58. Pressurization of the balloons 58 causes them to inflate and expand into conformal contact with the interior walls 45 of the stringer 36, closing off the ends of the stringer cavity 46 along a stretch 65 of the stringer 36, and forming the spaced apart containment walls 75.

With the balloons 58 having been inflated, a flowable sealant such as, without limitation, an expandable closed cell foam is flowed into one or both of the filler holes 52. In another embodiment, the sealant is flowed into one of the filler holes 52, while the other filler hole 52 functions to allow escape of displaced air and/or excess sealant. By flowing the sealant into one of the filler holes 52 until excess sealant flows out of the other filler hole 52, it may be verified that the stringer cavity 46 between the inflated balloons 58 has been completely filled with sealant. The containment walls 75 formed by the inflated balloons 58 contain the flowable sealant until the sealant sets up or cures.

After the stringer cavity 46 has been filled with sealant as described above, the sealant is allowed to set up or cure. In one embodiment, a sealant may be used which cures at room temperature, however in other embodiments, the sealant may be cured at elevated temperatures using suitable equipment. The cured sealant forms a barrier or dam 48 that seals off the interior of the stringer 36 and blocks the flow of fuel, fuel vapors and/or air through the stringer cavity 46. After the sealant has set up and/or has cured, the balloons 58 are deflated by removing positive air pressure from the air nipples 56. In some cases, however, it may be desirable or necessary to apply negative air pressure to the air nipples 56 in order to evacuate the balloons 58 and cause them to collapse and be drawn back against the air nipples 56 to facilitate withdrawal of the balloons 58 through the access holes 50. The balloons 58 and the sealant should be formed of materials that do not adhere to each other, and thus allow the balloons 58 to readily release from the sealant when the balloons 58 are deflated and removed from the interior of the stringer 36.

After the balloons 58 are deflated, the air nipples 56 along with the balloons 58 may be removed from the stringer 36 by withdrawing them, either as an assembly or individually, from the access holes 50. Optionally, retention elements 85 (FIG. 13) may be inserted through the filler holes 52 into the dam 48 in order to prevent the dam 48 from moving longitudinally within the stringer cavity 46, and to seal off the dam 48. The retention elements 85 may comprise, without limitation, non-metallic push-in screw out inserts. Optionally, inserts or other closures (not shown) may be inserted in the filler holes 50 in order to close the filler holes 50 and further seal off the dam 48.

Figure 16:
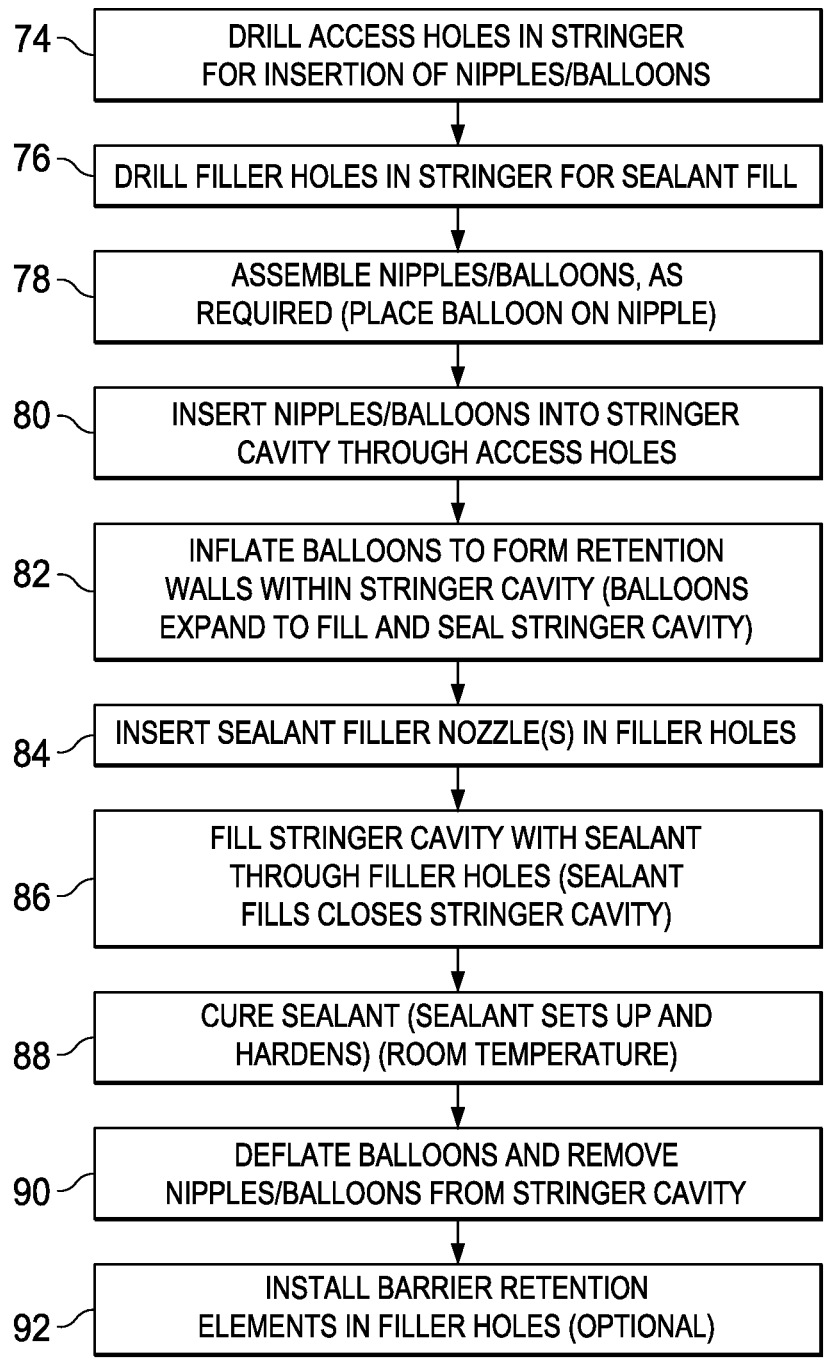
FIG. 16 is an illustration of a flow diagram showing the steps of a method of forming a dam inside a channel cavity within stringer.

FIG. 16 broadly illustrates the overall steps of a method of forming a barrier, such as the dam 48, in a cavity within an elongate structure, such as the cavity 46 in a stringer 36 previously described. Beginning at step 74, access holes 50 are drilled in a wall of the stringer 36 to allow insertion into the cavity 46 of air nipples 56 and inflatable balloons 58. At 76, filler holes 52 are formed, as by drilling in one or more walls of the stringer 36 to allow a sealant to be flowed into the stringer cavity 46.

At step 78, the air nipples 56 and balloons 58 may be assembled, by placing or sleeving the balloons 58 over the air nipples 56. At 80, the assembly of the air nipples 56 and balloons 58 are inserted through the access holes 50 into the stringer cavity 46. At step 82, the balloons 58 are inflated to form containment walls 75 inside the stringer cavity 46. As the balloons 58 are inflated, they expand to seal and close off a stretch the five of the stringer cavity 46. With containment walls 35 having been formed within the stringer cavity 46, then, at step 84, a sealant filler nozzle (not shown) coupled with a source of pressurized sealant, is inserted into the filler holes 52. At step 86, the stringer cavity 46 is filled with a suitable sealant by flowing the sealant through the filler holes 52. The flow of sealant, which may be an expandable foam, fills and closes off a stretch 65 of the stringer cavity 46.

At step 88, the sealant is allowed to set-up and harden, as by curing, which may occur at room temperature. With the sealant having set-up at step 88, then, at step 90 the balloons 58 may be deflated by pressurizing them, and the assembly of the air nipples 56 and balloons 58 can be removed from the stringer cavity 46. Optionally, at step 92, retention elements 85 may be inserted through the filler holes 52 into the dam 48 in order to prevent the dam 48 from shifting or moving within the stringer cavity 46.

Embodiments of the disclosure may find use in a variety of potential applications, particularly in the transportation industry, including for example, aerospace, marine, automotive applications and other application where structures, particularly elongate structural members, having internal cavities, require installation of an interior barrier or dam. Thus, referring now to FIGS. 17 and 18, embodiments of the disclosure may be used in the context of an aircraft manufacturing and service method 94 as shown in FIG. 17 and an aircraft 96 as shown in FIG. 18. Aircraft applications of the disclosed embodiments may include, for example, without limitation, stringers and similar elongate structural members having internal cavities that must be blocked or closed off to prevent the flow of fluids or gases therethrough. During pre-production, exemplary method 94 may include specification and design 98 of the aircraft 96 and material procurement 100. During production, component and subassembly manufacturing 102 and system integration 104 of the aircraft 96 takes place. The disclosed barrier or dam 48 may be easily installed either during the component and subassembly manufacturing stage 102 or during system integration 104. Thereafter, the aircraft 96 may go through certification and delivery 106 in order to be placed in service 108. While in service by a customer, the aircraft 96 is scheduled for routine maintenance and service 110, which may also include modification, reconfiguration, refurbishment, and so on. The disclosed barrier or dam 48 may also be installed on the aircraft 96 as a retrofit item while the aircraft 96 is in service 108, for example, while maintenance and service is being performed on the aircraft 96.

Each of the processes of method 94 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 96 produced by exemplary method 94 may include an airframe 112 with a plurality of systems 114 and an interior 116. Examples of high-level systems 114 include one or more of a propulsion system 118, an electrical system 120, a hydraulic system 122 and an environmental system 124. Any number of other systems may be included. The airframe 112 may include wings 22 containing integral fuel tanks 24 which are formed by structural components of the wings 22, such as a stringer 36. The flow of fuel and fuel vapors through the stringer 36 is blocked by a barrier or dam 48 which is installed a cavity in the stringer 36 in accordance with the disclosed embodiments. Although an aerospace example is shown, the principles of the disclosure may be applied to other industries, such as the marine and automotive industries.

Systems and methods embodied herein may be employed during any one or more of the stages of the production and service method 94. For example, components or subassemblies corresponding to production process 102 may be fabricated or manufactured in a manner similar to components or subassemblies produced while the aircraft 96 is in service. Also, one or more apparatus embodiments, method embodiments, or a combination thereof may be utilized during the production stages 102 and 104, for example, by substantially expediting assembly of or reducing the cost of an aircraft 96. Similarly, one or more of apparatus embodiments, method embodiments, or a combination thereof may be utilized while the aircraft 96 is in service, for example and without limitation, to maintenance and service 110.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of installing a barrier within an elongate cavity in a structure, comprising:
    inserting a first balloon, uninflated, into the elongate cavity through a first side of the structure;
    inserting a second balloon, uninflated, into the elongate cavity through the first side of the structure, and wherein a space is formed within the cavity between the first balloon and the second balloon;
    thereafter sealing the space from other portions of the elongate cavity by inflating both the first balloon and the second balloon, the space forming only as a result of inflating the first balloon and the second balloon, and wherein the space between the first balloon and the second balloon is empty;
    thereafter filling the space with a sealant;
    allowing the sealant to cure; and
    removing the first balloon and the second balloon.

2. The method of claim 1, wherein inserting the first balloon and the second balloon includes:
    forming a first opening and a second opening in the structure, and
    inserting the first balloon and the second balloon into the first opening and the second opening, respectively.

3. The method of claim 2, further comprising:
    forming the first balloon by placing a first membrane over a first nipple;
    forming the second balloon by placing a second membrane over a second nipple;
    inserting the first nipple and the second nipple respectively through the first opening and the second opening; and
    using the first nipple and the second nipple respectively to direct pressurized air into the first membrane and the second membrane.

4. The method of claim 3, wherein forming the first balloon and the second balloon is performed before the first nipple and the second nipple are inserted into the first opening and the second opening, respectively.

5. The method of claim 1, wherein filling the space with the sealant includes:
    forming at least one opening in a wall of the structure bordering the space; and
    flowing the sealant through the opening into the space.

6. The method of claim 1, wherein filling the space with the sealant includes:
    flowing an expandable foam into the space; and
    allowing the expandable foam to cure before the first balloon and the second balloon are removed.

7. The method of claim 1, wherein the first balloon is inserted to extend to an inside surface of the structure opposite the first side and wherein the second balloon is inserted to extend to the inside surface of the structure opposite the first side.

8. A method of installing a dam within a cavity in a stringer of an aircraft, the method comprising:
    inserting a first balloon, uninflated, into the cavity through a first side of the stringer;
    inserting a second balloon, uninflated, into the cavity through the first side of the stringer, and wherein a space is formed within the cavity between the first balloon and the second balloon;
    sealing the space from other portions of the cavity by inflating both the first balloon and the second balloon, the space forming only as a result of inflating the first balloon and the second balloon, and wherein the space between the first balloon and the second balloon is empty;
    flowing a sealant into the cavity of the stringer between the first balloon and the second balloon; and
    removing the first balloon and the second balloon from the cavity in the stringer.

9. The method of claim 8, further comprising:
    deflating the first balloon and the second balloon after the sealant has been flowed into the space.

10. The method of claim 8, wherein installing the first balloon and the second balloon is performed by:
    forming a first opening spaced apart from a second opening in the stringer, and
    inserting the first balloon into the first opening and inserting the second balloon into the second opening.

11. The method of claim 10, further comprising:
    forming the first balloon by sleeving a first membrane over a first nipple;
    forming the second balloon by sleeving a second membrane over a second nipple; and
    inserting the first nipple into the first opening and inserting the second nipple into the second opening.

12. The method of claim 11, wherein inflating the first balloon and the second balloon comprises flowing pressurized air through the first nipple and the second nipple.

13. The method of claim 8, further comprising:
    forming at least one hole in a wall of the stringer, and
    wherein flowing the sealant into the space in the stringer includes flowing the sealant through the at least one hole.

14. The method of claim 8, wherein the first balloon is inserted to extend to an inside surface of the structure opposite the first side and wherein the second balloon is inserted to extend to the inside surface of the structure opposite the first side.

* * * * *

UNITED STATES PATENT AND TRADEMARK OFFICE
CERTIFICATE OF CORRECTION

PATENT NO. : 10,023,321 B1  
APPLICATION NO. : 13/926225  
DATED : July 17, 2018  
INVENTOR(S) : Oyzerskiy Page 1 of 1

It is certified that error appears in the above-identified patent and that said Letters Patent is hereby corrected as shown below:

In the Claims

Column 10, Line 54, change "of the structure" to --of the stringer--  
Column 10, Line 56, change "of the structure" to --of the stringer--

Signed and Sealed this  
Thirtieth Day of October, 2018

Andrei Iancu  
*Director of the United States Patent and Trademark Office*